United States Patent
Adiga Manoor et al.

(10) Patent No.: US 12,184,162 B1
(45) Date of Patent: Dec. 31, 2024

(54) POWERING AN IMPEDANCE INJECTION UNIT DURING STARTUP OPERATIONS

(71) Applicant: Smart Wires Inc., Union City, CA (US)

(72) Inventors: Shreesha Adiga Manoor, Milpitas, CA (US); Vinod Babu, Karnataka (IN); Govind Chavan, Union City, CA (US); Haroon Inam, San Jose, CA (US); Amrit Iyer, Oakland, CA (US); Arthur Kelley, Cary, NC (US); Volodymyr Strelchuk, Castro Valley, CA (US)

(73) Assignee: Smart Wires Inc., Durham, NC (US)

( * ) Notice: Subject to any disclaimer, the term of this patent is extended or adjusted under 35 U.S.C. 154(b) by 872 days.

(21) Appl. No.: 17/249,278

(22) Filed: Feb. 25, 2021

Related U.S. Application Data (60) Provisional application No. 63/031,844, filed on May 29, 2020.

(51) Int. Cl.
| | | |
|---|---|---|
| H02M 1/32 | (2007.01) | |
| G05F 1/12 | (2006.01) | |
| H02J 3/20 | (2006.01) | |
| H02M 3/07 | (2006.01) | |

(52) U.S. Cl.
CPC ............. *H02M 1/32* (2013.01); *G05F 1/12* (2013.01); *H02J 3/20* (2013.01); *H02M 3/07* (2013.01)

(58) Field of Classification Search
None
See application file for complete search history.

(56) References Cited

U.S. PATENT DOCUMENTS

| | | | |
|---|---|---|---|
| 5,303,248 A | 4/1994 | Gibbs | |
| 5,491,731 A | 2/1996 | Corpora et al. | |
| 5,811,882 A | 9/1998 | Latham, IV et al. | |
| 5,883,378 A | 3/1999 | Irish et al. | |
| 6,633,092 B2 * | 10/2003 | Dahler | H02J 3/1814 |
| | | | 307/45 |
| 6,782,703 B2 | 8/2004 | Dovali-Solis | |
| 6,844,768 B2 | 1/2005 | Bankman et al. | |
| 7,145,372 B2 | 12/2006 | Tang et al. | |

(Continued)

OTHER PUBLICATIONS

Filsecker et al., Comparison of 4.5-KV Press-Pack IGBTs and IGCTs for Medium-Voltage Converters, Feb. 2013, IEEE, Industrial Electronics, IEEE Transactions on, vol. 60, No. 2, pp. 440-449. (Year: 2013).*

*Primary Examiner* — Thomas J. Hiltunen
(74) *Attorney, Agent, or Firm* — Womble Bond Dickinson (US) LLP (57) ABSTRACT

A multi-mode power supply is described for providing power to an impedance injection unit that is operable to inject reactive power into a power transmission line. The impedance injection unit is configured to operate safely in the presence of switching states of the impedance injection unit, and in the presence of disturbances such as surge currents in the power transmission line, by the multi-mode power supply clamping a potential overvoltage to a safe level. The power supply contains analog and digital circuits and can recover automatically from a surge current in the transmission line, or from a condition of zero line current. Power harvesting may be achieved via a line connected current transformer, via an internal current transformer, via a DC link capacitor, or from combinations of these.

17 Claims, 4 Drawing Sheets

(56) References Cited

U.S. PATENT DOCUMENTS

| | | | |
|---|---|---|---|
| 7,589,573 B2 | 9/2009 | Tang et al. | |
| 8,154,890 B2 * | 4/2012 | Yasuda | H02M 1/36 |
| | | | 363/37 |
| 8,671,688 B2 | 3/2014 | Rogers et al. | |
| 9,077,412 B2 | 7/2015 | Chang et al. | |
| 9,099,933 B2 * | 8/2015 | Jones | H02M 5/42 |
| 9,222,410 B2 | 12/2015 | Chillar et al. | |
| 9,435,228 B2 | 9/2016 | Sieben et al. | |
| 9,843,176 B2 * | 12/2017 | Gibson | H02J 11/00 |
| 10,367,428 B2 * | 7/2019 | Tsuchiya | H02M 7/4835 |
| 10,826,383 B2 * | 11/2020 | Okuyama | H02M 7/53871 |
| 11,101,656 B2 * | 8/2021 | Yamanaka | H02J 3/1857 |
| 11,489,432 B2 * | 11/2022 | Ishii | H02M 1/0006 |
| 2004/0045300 A1 | 3/2004 | Dovali-Solis | |
| 2012/0198846 A1 | 8/2012 | Sieben et al. | |
| 2012/0260667 A1 | 10/2012 | Chillar et al. | |
| 2012/0260668 A1 | 10/2012 | Rogers et al. | |
| 2013/0208519 A1 * | 8/2013 | Yamamoto | H02M 7/48 |
| | | | 363/67 |
| 2014/0027638 A1 | 1/2014 | Chang et al. | |
| 2014/0216001 A1 | 8/2014 | Sieben et al. | |
| 2020/0161458 A1 * | 5/2020 | Liu | H01L 29/739 |

\* cited by examiner

POWERING AN IMPEDANCE INJECTION UNIT DURING STARTUP OPERATIONS

CROSS REFERENCE TO RELATED APPLICATIONS

This application claims the benefit of U.S. Provisional Application No. 63/031,844, filed on May 29, 2020, the disclosure of which is incorporated herein by reference in its entirety.

TECHNICAL FIELD

The subject technology relates generally to power transmission and distribution systems. More particularly, the subject technology relates to a power supply for an impedance injection unit that is configured to start up in a controlled manner following a surge current in the associated power transmission line or following a line energization scenario from an initial state of zero line current.

BACKGROUND

Modern-day distributed power generation and distribution systems have introduced multi-generator grids and new modes of operation. These new modes of operation will likely introduce power electronic (PE) converters, such as impedance injection units used to inject reactive impedance or reactive power into transmission lines. Surge currents occur on power transmission lines due to multiple causes including load switching and faults from the transmission lines to ground. The surge currents may blow out control circuitry in an impedance injection unit unless mitigating steps are taken.

Accordingly, there is a need in the art for a power supply in an impedance injection unit that is configured to withstand surge currents and to respond in a controlled manner. It is desirable that the power supply can also start up safely from zero line-current.

BRIEF DESCRIPTION OF THE DRAWINGS

A first aspect of the subject technology relates to a power supply for an impedance injection unit coupled to a phase of a power transmission line. The power supply includes a charge harvester that harvests charges from the phase of the power transmission line. Circuitry in the power supply clamps the voltage of the harvested charges to withstand surge currents or over-voltages arising from disturbances on the phase of the power transmission line. The power supply generates a supply voltage to a controller of the impedance injection unit to control the injection of the reactive power into the phase of the power transmission line.

A second aspect of the subject technology relates to a method for operating an impedance injection unit applied to a phase of a power transmission line. The method includes providing a multi-mode power supply coupled to the phase of the power transmission line. The method also includes harvesting charges by the multi-mode power supply from the phase of the power transmission line to charge a DC link capacitor using a power switching assembly. The power switching assembly includes a bank of insulated-gate bipolar transistors (IGBTs). The method further includes the bank of IGBTs clamping the voltage of the DC link capacitor to tolerate in-rush currents into the DC link capacitor when the converter begins to operate, and to route that current to generate the supply voltage for control of the impedance injection unit.

The accompanying drawings are provided together with the following description of various aspects and embodiments of the subject technology for a better comprehension of the invention. The drawings and the embodiments are illustrative of the invention and are not intended to limit the scope of the invention. It is understood that a person of ordinary skill in the art may modify the drawings to generate drawings of other embodiments that would still fall within the scope of the invention.

DETAILED DESCRIPTION

Examples of various aspects and variations of the subject technology are described herein and illustrated in the accompanying drawings. Objects, features, and advantages of the invention will be apparent from the following detailed description taken in conjunction with the accompanying drawings. While various embodiments of the subject technology are described, the following description is not intended to limit the invention to these embodiments, but rather to enable a person skilled in the art to make and use this invention.

A multi-mode power supply is described for providing power to an impedance injection unit that is operable to inject reactive power into one or more phases of a power transmission line. It is configured to operate safely in the presence of disturbances such as surge currents in the power transmission line, clamping a potential overvoltage to a safe level. The power supply contains analog and digital circuits and can recover automatically from a surge current in the transmission line, or from a condition of zero line-current. Power harvesting may be achieved via a line-connected current transformer, via an internal current transformer, via a DC link capacitor, or from combinations of these.

Figure 1:
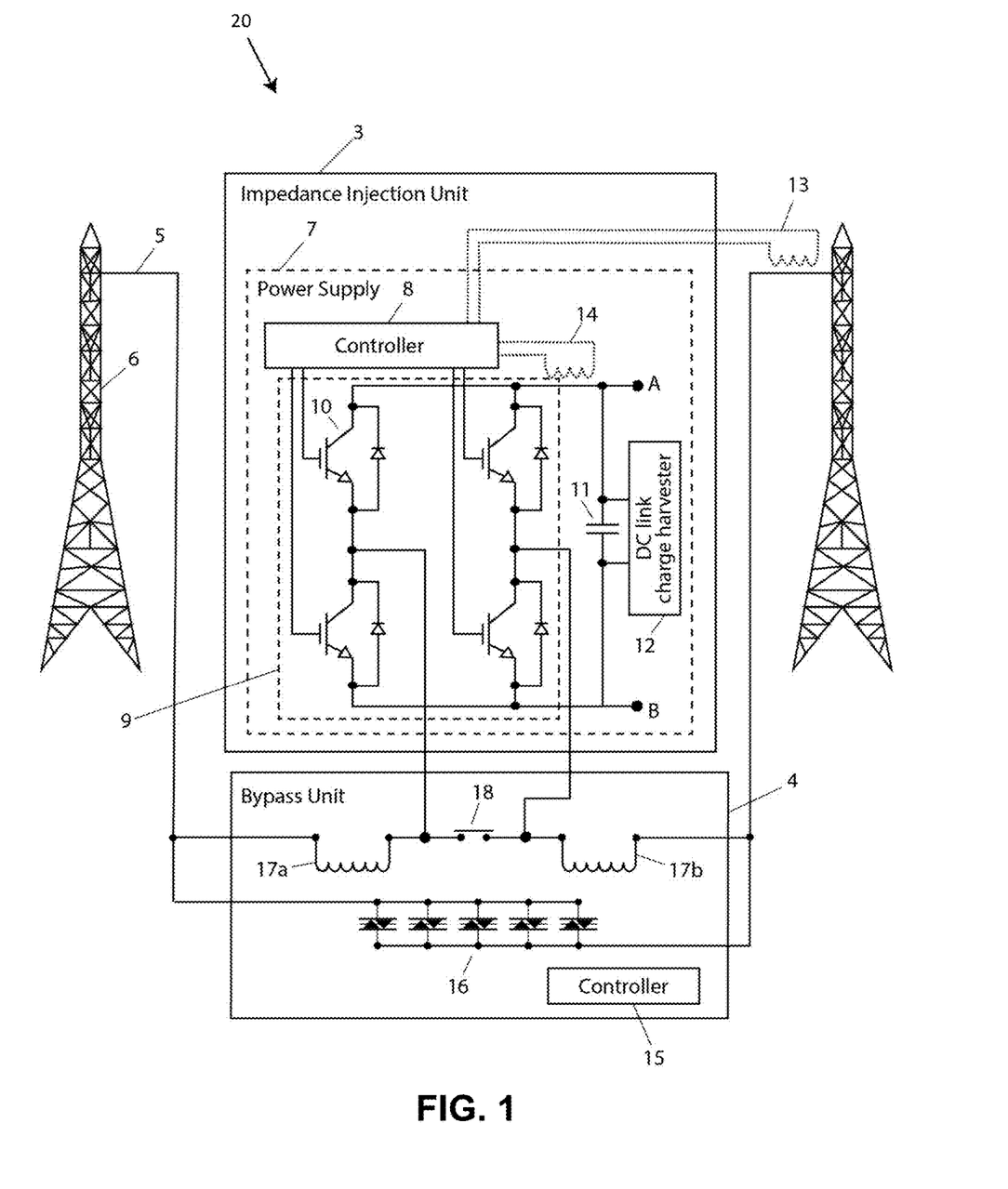
FIG. 1 is a schematic drawing of an impedance injection unit and a bypass unit connected to a power transmission line, according an embodiment of the subject technology.

FIG. 1 illustrates a power flow control system 20 including an impedance injection unit 3 and a bypass unit 4 connected to a power transmission line 5 carried by transmission towers 6, according to an embodiment of the subject technology. The impedance injection unit 3 includes a power supply 7 comprising a controller 8 and a power switching assembly 9 having high power switching devices such as IGBTs (insulated-gate bipolar transistors) 10 connecting to nodes A and B. Nodes A and B are internal nodes. VA-VB, the voltage across the DC link capacitor 11 will be designated $V_{BUS}$ in FIG. 3. Power supply 7 also includes a DC link capacitor 11 with an associated charge harvester 12. It will be shown that power supply 7 is operable to harvest power from a line-connected current transformer 13, or from an internal current transformer 14, or from the DC link capacitor 11, or from combinations of these. A current transformer may be designated by the acronym CTP. Note that use of the line-connected current transformer 13 may require an expensive cable assembly, and in one embodiment only the internal current transformer 14 may be used.

Continuing with FIG. 1, bypass unit 4 includes a set of silicon-controlled rectifiers (SCRs) 16 that may be used to bypass a fault current in order to protect the impedance injection unit 3. Bypass unit 4 also includes differential chokes 17a and 17b, and a vacuum interrupter 18. A controller 15 may be configured to control the operation of bypass unit 4. It may be possible and useful to transfer power from bypass unit 4 to impedance injection unit 3 in some scenarios. The impedance injection unit 3 and the bypass unit 4 may independently handle surge currents safely, or they may cooperate in achieving this goal through coordination between controller 8 of power supply 7 and controller 15 of bypass unit 4.

Figure 2:
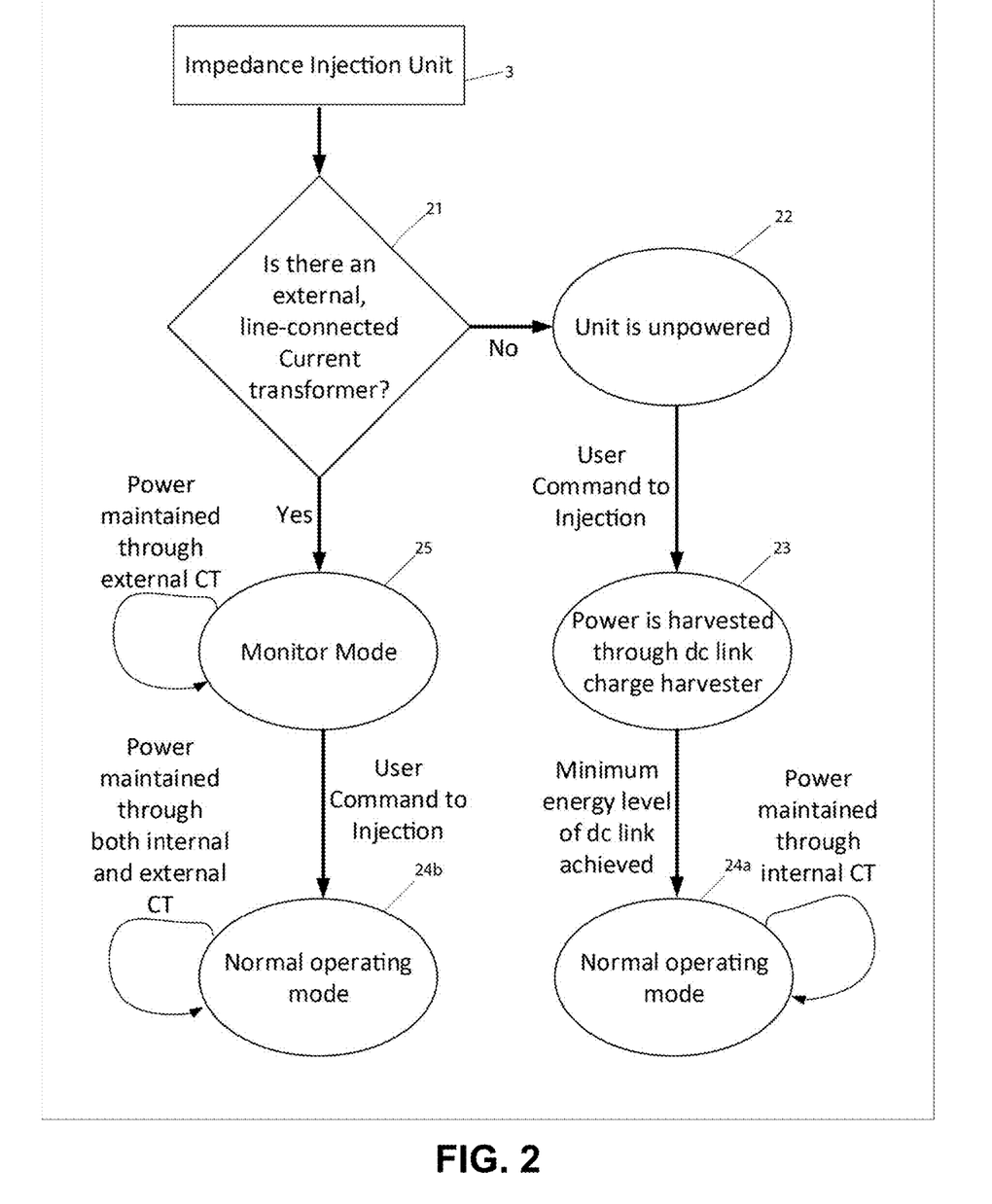
FIG. 2 is state diagram of an impedance injection unit during multiple modes of powered operation, according to an embodiment of the subject technology.

FIG. 2 is a state diagram showing power states and control information relating to an impedance injection unit, according to an embodiment of the subject technology. Impedance injection unit may be the impedance injection unit 3 of FIG. 1. Following the right branch of FIG. 2, in the absence of an external line-connected current transformer 13 the impedance injection unit 3 is unpowered at state 22. On a user command to enter injection mode the impedance injection unit 3 enters state 23, wherein power is harvested via the DC link charge harvester 12 of FIG. 1, to be further described. If a minimum level of DC link energy is achieved, as evidenced by measuring the voltage on DC link capacitor 11 and determining it to be above a pre-determined threshold, the impedance injection unit 3 enters normal operating mode 24a, and power is maintained through the internal current transformer 14 of FIG. 1.

Continuing with FIG. 2 and following the left branch of the figure, if there is an external line-connected current transformer 13 the impedance injection unit 3 enters monitor mode 25, wherein there is no injection of reactive power into the power transmission line 5 and unit power is maintained via the external line-connected current transformer 13. In monitor mode 25 the controller 8 is in control of the power supply 7 of FIG. 1. An instruction to enter injection mode may be wirelessly received by impedance injection unit 3 and executed using a controller residing in the impedance injection unit (not shown), with related parameters passing to controller 8 of power supply 7. In one embodiment, these two controllers may be combined into a single controller that may reside in the power supply 7 or in the impedance injection unit 3 outside of the power supply 7. Following a user command to enter injection mode the impedance injection unit 3 enters normal operating mode 24b, and power is maintained via a combination of the external line-connected current transformer 13 and the internal current transformer 14.

Figure 3:
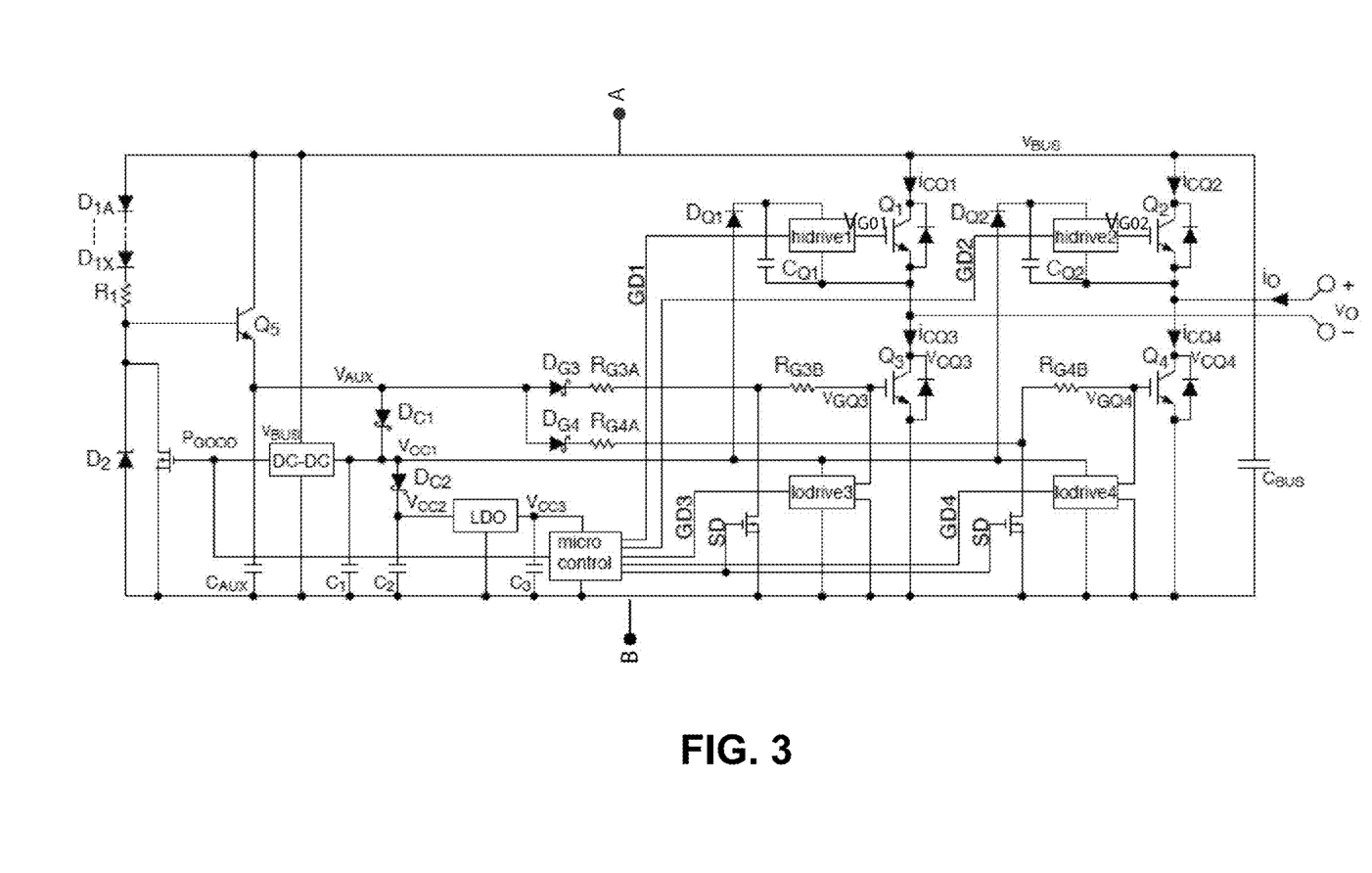
FIG. 3 is a schematic of a power supply for an impedance injection unit that is tolerant of in-rush currents in the power transmission line, according to an embodiment of subject technology.

FIG. 3 depicts a circuit diagram of power supply 7, according to an embodiment of the subject technology. For conciseness and brevity of description, electronic nomenclature is used to label the components and the signals. In FIG. 3, $V_{BUS}$ designates the voltage VA-VB of FIG. 1 and $C_{BUS}$ designates the DC link capacitor 11. There may be up to four of these inverters in parallel (e.g., the set of IGBTs, Q1, Q2, Q3, Q4) in any impedance injection unit 3 but for simplicity just one set is shown. Vo and the current through it, io, are the voltage applied by the power switching assembly 9, and current through the transmission line 5, respectively. $V_{CC3}$ is the voltage at the output of this power supply 7. The DC link capacitor 11 is $C_{BUS}$ with voltage $V_{BUS}$ across it. The four inverter IGBTs are $Q_1$, $Q_2$, $Q_3$, and $Q_4$: these IGBTs are labeled 10 in FIG. 1. IGBTs $Q_3$ and $Q_4$ are "low side" and are controlled by connection of their gate terminals to "low side" gate drives lodrive3 and lodrive4, respectively. Both $Q_3$, $Q_4$, lodrive3 and lodrive4 are referenced to the negative terminal of $C_{BUS}$ and are powered by connection to $V_{CC1}$. IGBTs $Q_1$ and $Q_2$ are "high side" and are controlled by connection of their gate terminals to "high-side" gate drives hidrive1 and hidrive2, respectively. The high-side gate drives are referenced to the two output terminals (Vo+ and Vo−) of the power supply 7. For power they use the typical bootstrap configuration of $D_{Q1}$ and $C_{Q1}$ for $Q_1$ and $D_{Q2}$ and $C_{Q2}$ for $Q_2$. When $Q_3$ is on, charge is delivered by $D_{Q1}$ from $V_{CC1}$ into $C_{Q1}$. Similarly, when $Q_4$ is on, charge is delivered by $D_{Q2}$ from $V_{CC1}$ into $C_{Q2}$. $Q_3$ must be periodically turned on to "refresh" the voltage on $C_{Q1}$. Similarly, with $Q_4$ and $C_{Q2}$, $Q_4$ is periodically turned on to "refresh" the voltage on $C_{Q2}$. It is assumed that each hidrive has isolation built into its input so it can receive a signal directly from the controller 8 (shown as microcontroller operating with supply voltage $V_{CC3}$ as described below).

Startup of power supply 7 is implemented by an auxiliary power supply composed of diodes $D_{1A}$ to $D_{1x}$, $R_1$, $Q_5$ and $C_{AUX}$ powering the auxiliary power bus $V_{AUX}$. As $V_{BUS}$ charges during startup, $V_{AUX}$ rises along with it. The voltage appearing on $V_{AUX}$ is provided to the gate of $Q_3$ through $D_{G3}$, $R_{G3A}$ and $R_{G3B}$. Similarly, $V_{AUX}$ is provided to the gate of $Q_4$ through $D_{G4}$, $R_{G4A}$ and $R_{G4B}$. As $V_{BUS}$ and $V_{AUX}$ rise, eventually the voltage on the gates of $Q_3$ and $Q_4$ exceeds the threshold voltage VT of the IGBTs. Diodes $D_{1A}$ to $D_{1x}$, which may be as few as one to as many as needed, "program" the voltage difference between $V_{BUS}$ and $V_{AUX}$ and the voltage at which $V_{BUS}$ is clamped. In this clamped state, there must be, however, enough voltage on $V_{BUS}$ to start the controller 8 which, once powered up, can manage the remainder of the startup. This startup process is described in more detail in the following section.

When positive current io is first applied, the diodes for $Q_2$ and $Q_3$ conduct and the current flows into $C_{BUS}$ to begin charging $V_{BUS}$. The $V_{BUS}$ voltage appears across $Q_1$ and $Q_4$ minus the voltage drop across $Q_3$ and $Q_2$ respectively. When negative current io is applied, the diodes for $Q_1$ and $Q_4$ conduct and the current again flows into $C_{BUS}$ to continue charging $V_{BUS}$. These four diodes act as a full-wave bridge rectifier and, if the voltage $V_{BUS}$ is not clamped, io will quickly charge $V_{BUS}$ to a level that will damage the power electronic converter. Clamping of the voltage works as follows. As $V_{Bus}$ rises, $V_{AUX}$ rises along with it but at a lower voltage programmed by the forward voltage drop of diodes $D_{1A}$ to $D_{1x}$ and the base-emitter voltage $V_{BEQ5}$ of $Q_5$. This rising voltage is applied to the gates of $Q_3$ and $Q_4$ minus the forward voltage drop of diodes $D_{G3}$ and $D_{G4}$, respectively. At some point the gate voltages exceed the threshold voltage VT of the IGBTs and, depending on the polarity of the current io, the IGBTs clamp the bus voltage $V_{BUS}$ to a fixed value.

For the case of positive io $Q_4$ has a gate voltage, it conducts, and the current now circulates through IGBT $Q_4$ and the diode for $Q_3$. If more current io is applied, and the voltage across $Q_4$ rises because there is not enough gate drive, the diode for $Q_2$ conducts just a bit more current and charges $V_{BUS}$ to a higher value. This has the effect of putting more voltage on the gate of $Q_4$ which again diverts all the current back into IGBT $Q_4$. This is an example of a classic shunt regulator implemented with discrete components. It works automatically and with a delay measured in microseconds. When the current io reverses polarity it is IGBT $Q_3$ that conducts. This is an ac shunt regulator with each IGBT $Q_3$ or $Q_4$ conducting on alternate half cycles to clamp the bus voltage $V_{BUS}$ to a predetermined value. Note that all this time, $V_{CC1}$ is maintained one diode drop $D_{C1}$ below $V_{AUX}$. Similarly, $V_{CC2}$ is maintained one diode drop $D_{C2}$ below $V_{CC1}$. At some point during the clamping action of $Q_3$ and $Q_4$, the circuit is designed to generate enough voltage so that the low drop out (LDO) regulator can start the controller 8 supply voltage $V_{CC3}$. Sometime later the controller 8 completes boot up and begins operation. When this happens, the gate drive applied to $Q_3$ and $Q_4$ via $V_{AUX}$ is no longer required because the controller 8 takes over to manage the remainder of the startup via $V_{G01}$, $V_{G02}$, $V_{G03}$, and $V_{G04}$.

When controller 8 is ready to take over, it sends shutdown SD high. This turns off the clamping action. Resistors $R_{G3A}$ and $R_{G4A}$ limit the current drawn from the $V_{AUX}$ supply. Resistors $R_{G3B}$ and $R_{G4B}$ prevent shorting out the gate of $Q_3$ and $Q_4$ so that lodrive3 and lodrive4 can operate under the command of the controller 8. All four resistors can be relatively high value because they are only required to charge the high impedance gates of $Q_3$ and $Q_4$. Accordingly, the ongoing loss in the resistors is low after they are no longer needed for startup. However, even though there is enough voltage to power the controller 8, there may not be enough voltage to operate the gate drives hidrive1, hidrive2, lowdrive3 and lowdrive4 to fully turn on IGBTs $Q_1$ to $Q_4$. Therefore, it may be desirable to allow $V_{BUS}$ to charge more. There is a design tradeoff regarding the clamp voltage for $V_{BUS}$. The higher it is, the more voltage there is to operate the gate drives. But this also leads to higher dissipation in $Q_3$ and $Q_4$. In one embodiment, if it turns out that the high-dissipation in $Q_3$ and $Q_4$ is too much while waiting for the controller 8 to boot up, any of a number of dedicated PWM (pulse width modulation) controller chips may be used to manage startup without delay and then handoff later to the controller 8.

Whichever method is used, finally, $V_{BUS}$ is high enough to operate the gate drives and turn on the dc-to-dc converter to provide power to $V_{CC1}$. A typical dc-to-dc converter has a power good signal $P_{GOOD}$. This signal is routed to a transistor to turn off $V_{AUX}$. It is also routed to the controller 8 as a notification to begin normal operation and to control $Q_1$ to $Q_4$ according to the desired injection strategy. A desirable feature of this strategy is, unlike the CTP-based supply, it would start for very low currents. In fact, this startup strategy is not unlike that used for the CTP-based supply except it uses the full current rather than the current divided down by the CTP turn ratio. It's also not too different from the fault-handling circuit (FHC) used to ensure that the fault-handling SCRs are turned on when current is first applied in the bypass unit 4.

In one mode, current io is flowing, and it's desired to have power in the impedance injection unit 3 to keep the controller 8 working, but it's not desired to inject voltage Vo into the line. This mode may be referred to as a parasitic mode. In one embodiment of this parasitic mode there is no need to discharge $C_{BUS}$ and "import" power from outside to keep current circulating in the IGBTs while injecting no voltage. Maintaining power is easily accomplished by putting the power supply in "parasitic" mode. The bus voltage $V_{BUS}$ can be maintained at a low value, 20 V for example. The IGBTs are still switched but operated so that there is almost no injection into the line and just barely enough power reaches $C_{BUS}$ to maintain operation. In the parasitic mode, when the current io passes though zero and is therefore very small, this small amount of current is briefly allowed to flow into the bus capacitor $C_{BUS}$ to charge it. This results in inconsequential voltage injection and is close to "zero injection". Only enough charge is let in to keep the bus capacitor charged. This is known as a "dog ear" strategy that is used to power light dimmers except in that case the power is obtained when the voltage is near its zero crossing. If there is still too much current resulting in $V_{Bus}$ becoming too high, an alternate, even lower power scheme, would be to enter a "burst" mode where a small current is allowed to charge $C_{BUS}$ near the zero crossing, not on every cycle, but for a cycle or two and then not for several cycles. In one embodiment, a "bang bang" type controller would also work well. Since $V_{BUS}$ is being maintained at 20 V, there is plenty of "headroom" in the event of an accidental overcharge.

Situations may arise when the current drops to zero in the power transmission line 5. In this condition it is desired to keep the controller 8 operating but switching of the gate drives can be stopped resulting in an energy savings. In one embodiment, this topology uses the large bus capacitor $C_{BUS}$ to supply energy to the controller 8. The worst case for this scenario is when the current disappears when in parasitic mode and $V_{BUS}$ is as low as 20 V. Given that the energy demands of the controller 8 are small in comparison to the normal load on $V_{BUS}$, and given that almost all of the energy stored in $C_{BUS}$ is extracted as $V_{Bus}$ discharges from 20 V down to the point at which the LDO can no longer support $V_{CC3}$ (around 3.3 V), it is desirable to have sufficient energy in $C_{BUS}$ to support the controller 8 for enough time to gain control. The exact time depends on the implementation details. Also, care should be taken so that if current reappears during an intermediate state in which all the various supplies, i.e. $V_{CC1}$, $V_{CC2}$ and $V_{CC3}$, are not yet fully discharged, that operation can resume correctly. In particular, it may be desirable for there to be enough voltage to operate the gate drives.

It is desirable to keep the controller 8 working during monitor mode 25 in which io is zero and "local" power is not available. This may involve "importing" power from the outside. It is in this case that power is harvested via the external line-connected current transformer 13.

Figure 4:
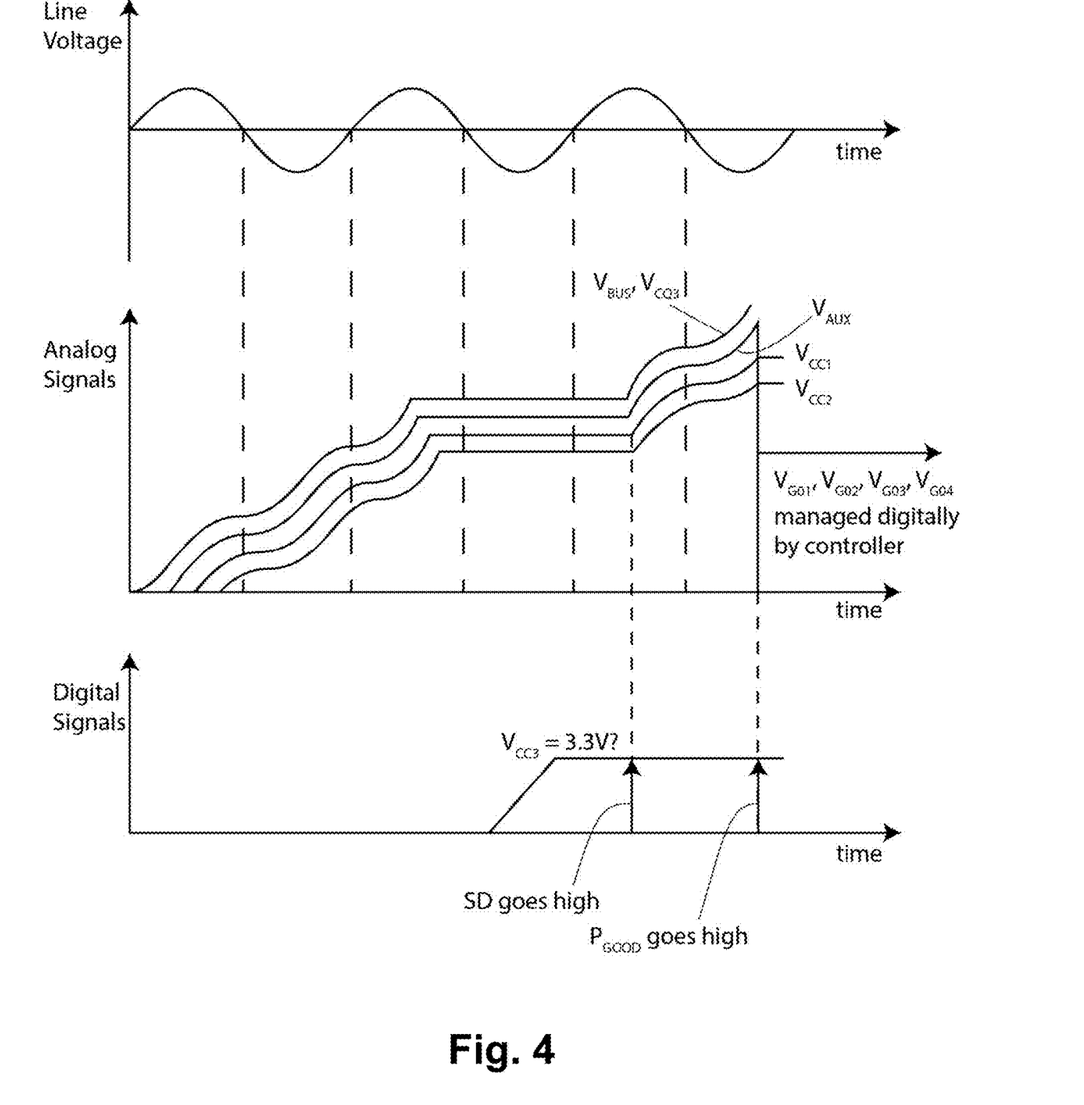
FIG. 4 is a graph of power and digital and analog control signals in a soft start sequence, according to an embodiment of the subject technology.

FIG. 4 is a graph that illustrates the progression of analog and digital control signals of power supply 7 of FIG. 3 during a startup sequence, in accordance with one embodiment. Cycles of the line voltage on the power transmission line 5 are shown. Analog signals $V_{BUS}$, $V_{CQ3}$, $V_{AUX}$, $V_{CC1}$, $V_{CC2}$, $V_{GQ1}$, $V_{GQ2}$, $V_{GQ3}$, and $V_{GQ4}$ are shown versus time. Digital signals $V_{CC3}$, SD, and $P_{GOOD}$ are also shown versus time.

The power supply 7 initially has no power, such as when the impedance injection unit 3 is in the unpowered state 22 of FIG. 2. The power supply 7 may begin to harness power from the transmission line 5 upon a user command to enter injection mode. As the current io charges the capacitor $C_{BUS}$, $V_{BUS}$ ramps up, as well as $V_{CQ3}$, the voltage at the collector of transistor Q3, and $V_{CQ4}$ (not shown). $V_{AUX}$, $V_{CC1}$, $V_{CC2}$ follow the rising voltage of $V_{BUS}$. When $V_{AUX}$ rises to a sufficient voltage level to turn on $Q_3$ and $Q_4$, the IGBTs act as a shunt regulator to clamp $V_{BUS}$.

The $V_{CC2}$ also rises sufficiently high to turn on the LDO regulator to generate the $V_{CC3}$ supply voltage to the microcontroller. In one embodiment, $V_{CC3}$ is 3.3V. When the micro-controller boots up, it generates the shutdown SD signal to turn off the clamping action of the IGBTs. $V_{BUS}$, $V_{AUX}$, $V_{CC1}$, $V_{CC2}$ may resume rising to allow the gate drives hidrive1, hidrive2, lowdrive3 and lowdrive4 to fully turn on IGBTs $Q_1$ to $Q_4$. When $V_{BUS}$ is high enough to operate the gate drives and turn on the dc-to-dc converter to provide power to $V_{CC1}$, the dc-to-dc converter generates the power good signal $P_{GOOD}$. $V_{AUX}$ is then turned off and the micro-controller generates $V_{GQ1}$, $V_{GQ2}$, $V_{GQ3}$, and $V_{GQ4}$ to control IGBTs $Q_1$ to $Q_4$ to operate the impedance injection unit 3 in the normal operating mode 24a.

The methods, devices, processing, and logic described above may be implemented in many different ways and in many different combinations of hardware and software. For example, electronic circuitry or a controller may be configured with hardware and/or firmware to perform the various functions described. All or parts of the implementations may be circuitry that includes an instruction processor, such as a Central Processing Unit (CPU), microcontroller, or a microprocessor: an Application Specific Integrated Circuit (ASIC), Programmable Logic Device (PLD), or Field Programmable Gate Array (FPGA): or circuitry that includes discrete logic or other circuit components, including analog circuit components, digital circuit components or both: or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. The implementations may be distributed as circuitry among multiple system components, such as among multiple processors and memories, optionally including multiple distributed processing systems.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk: or in or on another machine-readable medium.

The foregoing description, for purposes of explanation, uses specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed: obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. The examples are thus illustrative and non-limiting. It is intended that the following claims and their equivalents define the scope of the invention.

What is claimed is:

1. An impedance injection unit for injecting reactive power into a phase of a power transmission line, the impedance injection unit comprising:
a controller configured to control injection of the reactive power into the phase of the power transmission line; and
a power supply configured to withstand a surge current, an in-rush current, or an over-voltage arising from a disturbance on the phase of the power transmission line, or mode switching of the impedance injection unit, the power supply comprising:
a charge harvester configured to harvest charges from the phase of the power transmission line; and
circuitry configured to clamp a voltage of the harvested charges to a specific value to withstand the in-rush current or the over-voltage to generate a supply voltage to the controller;
wherein:
the impedance injection unit is configured to start from a powered down state;
the controller is configured to execute a boot up routine when the controller receives the supply voltage from the power supply; and
when the controller completes the boot-up routine, the controller is configured to disable the circuitry that clamps the voltage of the harvested charges.

2. The impedance injection unit of claim 1, wherein the circuitry of the power supply is further configured to generate the supply voltage to power up the controller based on the clamped voltage following the disturbance on the phase of the power transmission line.

3. The impedance injection unit of claim 1, wherein the circuitry of the power supply is further configured to generate the supply voltage to power up the controller based on the clamped voltage from a condition of zero current on the phase of the power transmission line.

4. The impedance injection unit of claim 1, wherein the circuitry comprises analog and digital circuitry configured to recover from the surge current or the over-voltage or to start from a condition of zero current on the phase of the power transmission line to generate the supply voltage to the controller.

5. The impedance injection unit of claim 1, wherein the power supply is further configured to receive power from an external line-connected current transformer.

6. The impedance injection unit of claim 1, wherein the power supply is further configured to receive power from an internal current transformer.

7. The impedance injection unit of claim 1, wherein the charge harvester comprises a direct current (DC) link capacitor configured to store the harvested charges from the phase of the power transmission line.

8. The impedance injection unit of claim 7, wherein the circuitry comprises a power switching assembly configured to charge the DC link capacitor.

9. The impedance injection unit of claim 8, wherein the power switching assembly comprises a bank of insulated-gate bipolar transistors (IGBTs).

10. The impedance injection unit of claim 9, wherein the bank of IGBTs are configured to clamp the voltage of the harvested charges to the specific value to withstand the in-rush current or the over-voltage to generate a supply voltage to the controller.

11. The impedance injection unit of claim 1, wherein the circuitry is further configured to receive the harvested charges to generate the supply voltage to maintain operation of the controller even when the phase of the transmission line drops to zero current.

12. The impedance injection unit of claim 1, wherein the charge harvester is configured to continue to harvest charges from the phase of the power transmission line for the power supply to maintain the supply voltage to operate the controller when the controller is configured not to control the injection of reactive power into the phase of the power transmission line.

13. A method for safely operating an impedance injection unit applied to a phase of a power transmission line, the method comprising:
providing a multi-mode power supply coupled to the phase of the power transmission line;

harvesting charges from the phase of the power transmission line to charge a direct current (DC) link capacitor through a power switching assembly that comprises a bank of insulated-gate bipolar transistors (IGBTs) of the multi-mode power supply; and clamping by the bank of IGBTs a voltage of the DC link capacitor to a specific value to withstand in-rush current associated with mode switching of the impedance injection unit when on a phase of the power transmission line, and to generate a supply voltage for the impedance injection unit from the multi-mode power supply.

14. The method of claim 13, further comprising:

harvesting power from an external line-connected current transformer by the multi-mode power supply to generate the supply voltage for the impedance injection unit.

15. The method of claim 13, further comprising:

harvesting power from an internal current transformer by the multi-mode power supply to generate the supply voltage for the impedance injection unit.

16. The method of claim 13, further comprising:

harvesting by the DC link capacitor the charges from the phase of the power transmission line starting from a powered down state of the impedance injection unit.

17. The method of claim 13, further comprising:

continuing harvesting charges from the phase of the power transmission line for the multi-mode power supply to maintain the supply voltage to the impedance injection unit even when the impedance injection unit is not injecting reactive power into the phase of the power transmission line.

* * * * *